Feb. 9, 1926.  
C. McNEIL  
1,572,735  
SPRING RELIEVING GEAR FOR ROLLS OF SUGAR CANE MILLS,  
METAL ROLLING MILLS, AND THE LIKE  
Filed Oct. 20, 1924  2 Sheets-Sheet 2

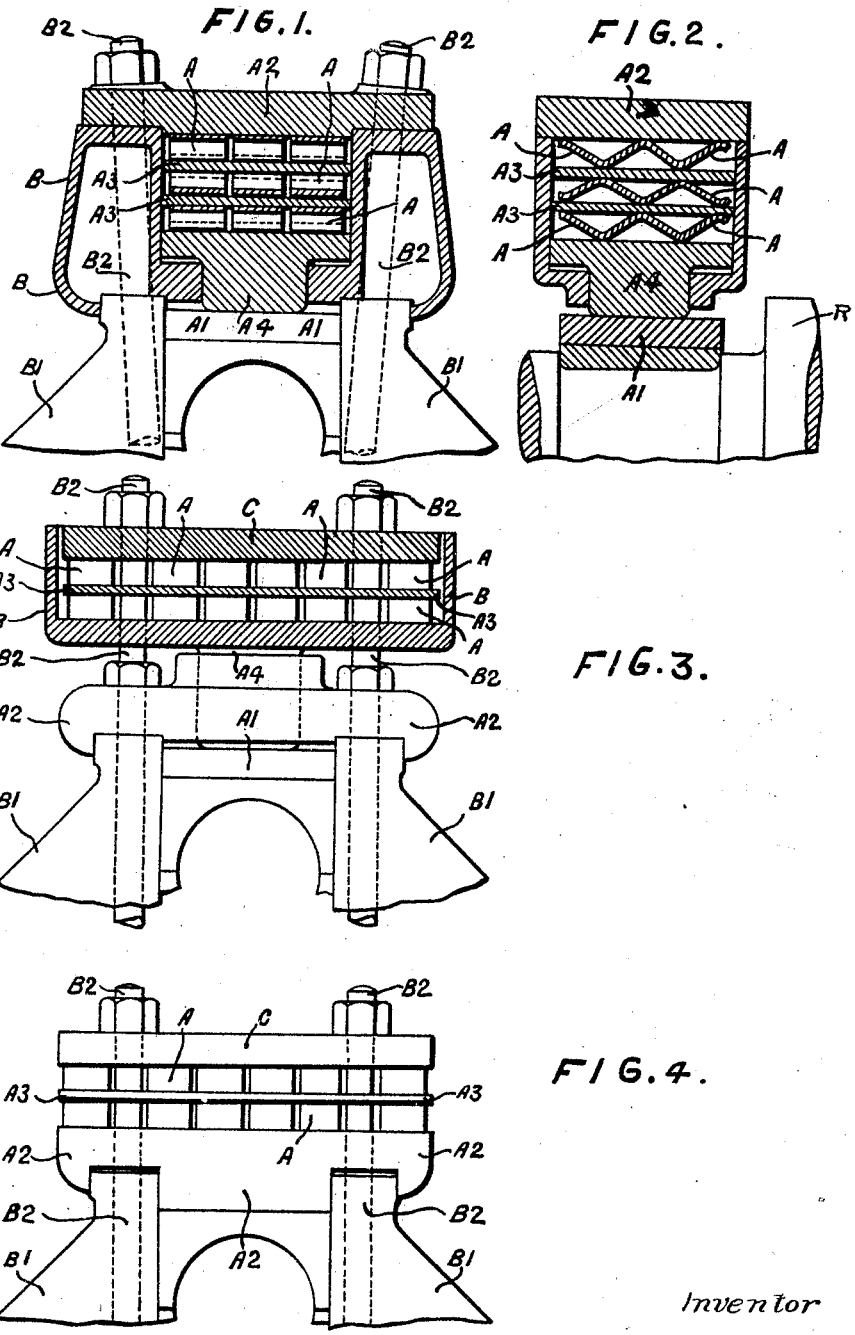

Inventor  
Charles McNeil  
by his Attorneys  
Howson and Howson

Patented Feb. 9, 1926.

1,572,735

UNITED STATES PATENT OFFICE.

CHARLES McNEIL, OF GLASGOW, SCOTLAND.

SPRING-RELIEVING GEAR FOR ROLLS OF SUGAR-CANE MILLS, METAL-ROLLING MILLS, AND THE LIKE.

Application filed October 20, 1924. Serial No. 744,749.

*To all whom it may concern:*

Be it known that I, CHARLES McNEIL, a British subject, and a resident of Glasgow, Scotland, have invented certain new and useful Spring-Relieving Gears for Rolls of Sugar-Cane Mills, Metal-Rolling Mills, and the like, of which the following is the specification.

The invention relates to spring relieving gear for rolls of sugar-cane mills, metal rolling mills and the like, of the type in which the springs used are formed of plates of spring material in corrugated form or of such curvilinear profile as will impart spring action thereto; and has for its object to provide an improved form of spring relieving gear for rolls in which the deflection of the springs may be multiplied, thereby forming a simple and effective safety device, and in which the springs are self adjusting.

A spring relieving gear for rolls made according to the invention consists essentially of layers of spring elements, placed between the outer half of the roll bearing and a bolster or equivalent, the layers being separated from each other by the insertion between the layers of distance pieces, which very conveniently may be in the form of plates, blocks, or rods, each layer consisting of one or more spring elements formed of comparatively narrow plates of spring material of known curvilinear form. The spring elements may lie either parallel to the roll axis or transversely and at right angles thereto and may be either laminated or not, as desired.

The total deflection of the relieving gear may be increased by increasing the number of layers of spring elements, so as to give a plurality of elements in parallel, means for measuring the deflection may be provided in known manner—very conveniently by an arm or pointer secured to the pressure block and adapted to move over a fixed scale. The movement of this pointer may be multiplied by any suitable mechanism.

The bolster is of course held down by the usual king-bolts or equivalent means and the pressure of the spring elements is regulated by the adjustment of these.

Obviously, clearance to allow of the endwise extension of the spring elements under pressure must be provided in the headstocks.

Several illustrative examples of the invention as applied to the top roll of a sugar-cane mill are shown in the drawings in which Figure 1, is an end sectional elevation and Figure 2 a sectional elevation at right angles to Figure 1 showing one example; Figures 3 and 4 are end elevations of a second and third example respectively, while Figures 5, 6, 7 and 8 are side elevations of four examples of layers of spring elements and the interposed members, and Figure 9 is a side elevation of a laminated spring element.

In the first example, as shown in Figures 1 and 2, spring elements A each consisting of a comparatively narrow corrugated plate of spring material lying parallel to the axis of the roll R, are positioned between the outer half of the usual roll bearing $A^1$ and an abutment member shown as the bolster $A^2$. Distance pieces $A^3$, in the form of rubbing plates are inserted between the spring elements and a rubbing plate formed integral with a pressure block $A^4$ is interposed between the roll bearing $A^1$ and the next adjacent spring element. The pressure block, as indicated in the drawings, is displaceable with the roll. In this example the relieving gear is carried in a housing B which is secured to the headstock $B^1$ by the usual king-bolts $B^2$ and bolster $A^2$.

In the second example (Figure 3) the relieving gear is carried in a housing B formed in one with the pressure block $A^4$ and the whole mounted on the usual king-bolts $B^2$ above the bolster $A^2$ through an aperture in which the pressure block $A^4$ projects and bears on the roll bearing $A^1$. A cover plate C on the king-bolts is provided above the spring elements to take the pressure.

In the third example (Figure 4) the usual bolster $A^2$ forms the bottom of the housing containing the relieving gear.

Figure 5 shows an example in which the distance pieces $A^3$ inserted between the layers of spring elements A are in the form of blocks on which bear the convex portions of adjacent layers of spring elements.

Figure 6 shows an example of the distance pieces $A^3$ so positioned that a convex portion of one layer and a concave portion of the adjacent layer of spring elements bear on the same block, thereby reducing the height of the relieving gear and thus economizing space, Figure 7 shows rod-like distance pieces $A^3$ in the form of round bars inserted in the space formed by the concave portions of adjacent layers of spring elements. It will be observed that these distance pieces have their greatest dimension parallel to the corrugations.

What I claim is:—

Figure 5:
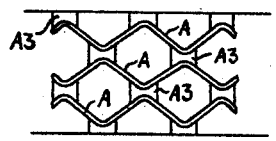
Figure 6:
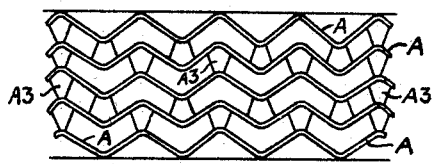
Figure 7:
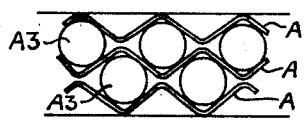
Figure 8:
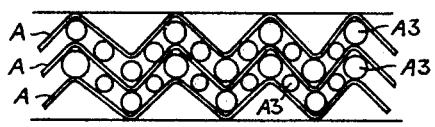
Figure 8 shows rod-like distance pieces $A^3$ also in the form of round bars, but so positioned that they, in effect, form rollers between the layers, thus reducing friction.
Figure 9:
Figure 9 shows one of the spring elements A of laminated construction.

1. In a rolling mill, a displaceable roll, a pressure block displaceable with the roll, an abutment member spaced from said block, in combination with a plurality of layers of spring elements in series interposed between the pressure block and the abutment member, each layer comprising a plurality of corrugated spring plates extending parallel with the axis of the roll and having corrugations transverse to said axis, and distance pieces between the layers.

2. In a rolling mill, a vertically displaceable roll, a pressure block displaceable with the roll and an abutment member spaced from said block, in combination with a plurality of superposed layers of spring elements interposed between the pressure block and the abutment member, each layer comprising a plurality of horizontally disposed spring plates extending parallel with the axis of the roll and having corrugations transverse to said axis, and rod-like distance pieces between the spring elements having their greatest dimension parallel to the corrugations.

In testimony whereof I have signed my name to this specification.

CHARLES McNEIL.